V. A. QUAGLIANO.
HEADLIGHT FOR VEHICLES.
APPLICATION FILED JUNE 16, 1920.
1,388,891.
Patented Aug. 30, 1921.
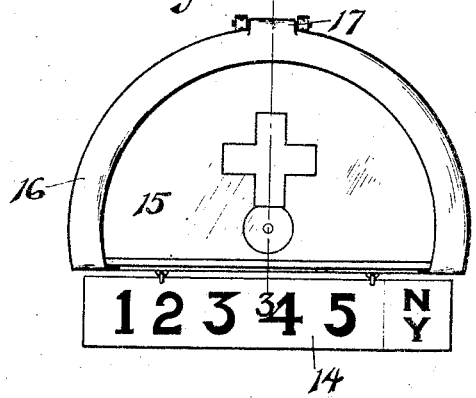
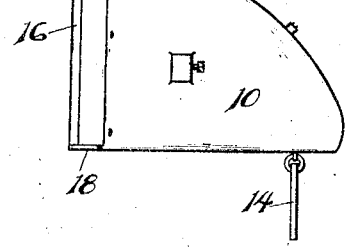
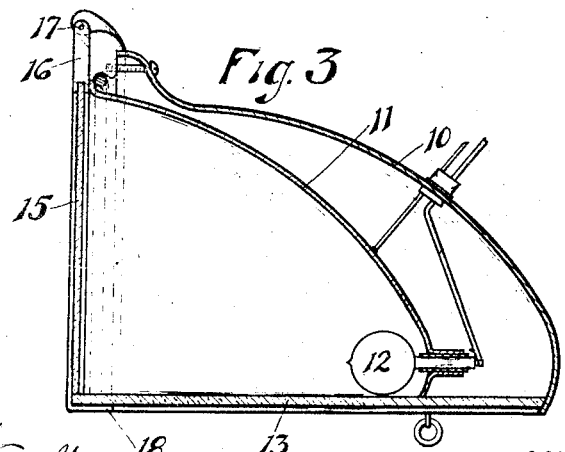
WITNESS:
Leo J. Griffin
INVENTOR,
VITO A. QUAGLIANO,
BY Frank N. Allen
ATTORNEY.

UNITED STATES PATENT OFFICE.

VITO A. QUAGLIANO, OF EAST BOSTON, MASSACHUSETTS.

HEADLIGHT FOR VEHICLES.

1,388,891.  Specification of Letters Patent.  Patented Aug. 30, 1921.

Application filed June 16, 1920. Serial No. 389,296.

*To all whom it may concern:*

Be it known that I, VITO A. QUAGLIANO, a citizen of the United States, residing at East Boston, in the county of Suffolk, in the State of Massachusetts, have invented a certain new and useful Improvement in Headlights for Vehicles, of which the following is a specification, reference being had to the accompanying drawings.

The object of this invention is to provide a simple and inexpensive headlight for use with vehicles, and particularly with automobiles; in which device special provision is made for illuminating the roadway immediately at the front of the automobile and for illuminating a license sign located below the light, as well as for throwing a searchlight ahead but at a slightly lower level than that of the eyes of parties approaching on foot or seated in other vehicles.

My invention is illustrated in the annexed drawings, Figure 1 being a front elevation of a head-light including my present improvements and Fig. 2 is a side elevation of the same. Fig. 3 is a relatively enlarged, central, vertical, sectional, view taken at the line 3—3 of Fig. 1.

Referring to these drawings, the numeral 10 indicates the housing of my improved headlight, the same being, preferably, of sheet metal of semi-cylindro-conical form in which is located a similarly shaped reflector 11 having mounted at or near the apex of the cone an incandescent electric light bulb 12 which is wired in circuit with any suitable source of electrical energy. In the lower part of the described housing is located a sheet 13 of clear glass which permits the rays of light from the lamp 12 to pass directly downward to the roadway and also to shine directly upon the exposed face of a license number plate 14 suspended below the headlight or attached to the car; this construction making it possible to dispense with the special lamp usually provided for illuminating the said number plate.

The front of the housing 10 is closed by a sheet of glass 15 which is mounted in a frame 16 that is hinged at 17 and is formed at its lower edge with an angular portion 18 which underlies the front edge of the bottom glass 13 when the frame 16 is closed, and thus serves as a support and protection for the otherwise exposed edge of said bottom glass.

The housing is suitably positioned so that the rays of reflected light are cast ahead and downward but are restricted as to their elevation and so that the glaring effect of said light is maintained at a level below the eyes of approaching travelers.

If desired a distinctive insignia may be mounted upon the front glass 15 to indicate the calling or profession of the owner of the automobile as, for example, a physician's auto or an ambulance may have displayed on the front glass a red cross as indicated in Fig. 1.

My described device may be cheaply manufactured; it provides not only the usual and required direct headlight but it lights the roadway immediately at the front of the vehicle and also serves to illuminate the number plate.

Having thus described my invention, I claim:—

1. A headlight for automobiles or the like comprising a housing having its front and lower sides open, a reflector within said housing and also having its front and lower sides open, a lamp within said reflector, a sheet of material arranged simultaneously to close the lower sides of said housing and reflector, a sheet of light transmitting material for closing the front of the housing, said sheet having a cruciform figure of distinctive color thereon, and means for hingedly supporting said latter sheet upon the housing.

2. A headlight for automobiles and the like comprising a housing of semi-conical form, a reflector within said housing, a source of illumination within said reflector, a substantially plain sheet of transparent material for closing the lower side of said housing and reflector, the space within said reflector being open and unobstructed, a sheet of light transmitting material for closing the front of said housing, said sheet having a figure comprising a Greek cross centrally disposed thereon, said cross being of distinctive color and of light transmitting material, and means at the lower rear portion of said housing for supporting a license plate.

3. A headlight comprising a semi-conical housing having its front and lower sides open, a sheet of transparent material forming a closure for the bottom of said housing, and a frame hinged adjacent to the upper, forward portion of the housing and carrying a sheet of transparent material for closing the front of the housing, said frame having a member constructed and arranged to underlap the forward edge of the first named sheet of transparent material whereby to support and protect the same.

VITO A. QUAGLIANO.